(12) United States Patent
Leenders

(10) Patent No.: US 10,597,498 B2
(45) Date of Patent: Mar. 24, 2020

(54) METHOD OF PRODUCING CRYSTALLINE POLYCARBONATE POWDERS

(71) Applicant: SABIC Global Technologies B.V., Bergen op Zoom (NL)

(72) Inventor: Chiel Albertus Leenders, Fijnaart (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/754,425

(22) PCT Filed: Aug. 25, 2016

(86) PCT No.: PCT/IB2016/055077
§ 371 (c)(1),
(2) Date: Feb. 22, 2018

(87) PCT Pub. No.: WO2017/033146
PCT Pub. Date: Mar. 2, 2017

(65) Prior Publication Data
US 2018/0244863 A1  Aug. 30, 2018

Related U.S. Application Data

(60) Provisional application No. 62/210,032, filed on Aug. 26, 2015.

(51) Int. Cl.
| | | |
|---|---|---|
| *C08G 64/08* | (2006.01) | |
| *C08J 3/14* | (2006.01) | |
| *C08J 3/28* | (2006.01) | |
| *C08G 64/40* | (2006.01) | |
| *B33Y 70/00* | (2020.01) | |
| *C08L 69/00* | (2006.01) | |
| *B29C 64/153* | (2017.01) | |
| *C08J 3/12* | (2006.01) | |
| *C08J 3/09* | (2006.01) | |

(52) U.S. Cl.
CPC .............. *C08J 3/14* (2013.01); *B29C 64/153* (2017.08); *B33Y 70/00* (2014.12); *C08G 64/40* (2013.01); *C08J 3/124* (2013.01); *C08J 3/28* (2013.01); *C08L 69/00* (2013.01); *C08J 3/093* (2013.01); *C08J 2369/00* (2013.01)

(58) Field of Classification Search
USPC ............................................. 528/196, 198
See application file for complete search history.

(56) References Cited

U.S. PATENT DOCUMENTS

| | | |
|---|---|---|
| 3,214,407 A | 10/1965 | Butterworth et al. |
| 3,267,074 A | 8/1966 | Wood |
| 4,778,858 A | 10/1988 | Ginnings |
| 5,204,377 A | 4/1993 | Fukawa et al. |
| 5,342,919 A | 8/1994 | Dickens, Jr. et al. |
| 5,523,361 A | 6/1996 | Tung et al. |
| 5,932,687 A | 8/1999 | Baumann et al. |
| 6,136,948 A | 10/2000 | Dickens, Jr. et al. |
| 6,531,086 B1 | 3/2003 | Larsson |
| 7,794,647 B1 | 9/2010 | Deckard |
| 8,361,364 B2 | 1/2013 | Eloo et al. |
| 2003/0181626 A1 | 9/2003 | Lindway |
| 2004/0232538 A1 | 11/2004 | Monsheimer et al. |
| 2005/0003189 A1 | 1/2005 | Bredt et al. |
| 2006/0223928 A1 | 10/2006 | Monsheimer et al. |
| 2007/0241482 A1 | 10/2007 | Giller et al. |
| 2011/0293918 A1 | 12/2011 | Lucas et al. |
| 2014/0295363 A1 | 10/2014 | Sun et al. |
| 2015/0024316 A1 | 1/2015 | Orrock et al. |
| 2015/0152233 A1 | 6/2015 | Corriol |

FOREIGN PATENT DOCUMENTS

| | | |
|---|---|---|
| DE | 4421454 A1 | 12/1995 |
| EP | 0376653 A2 | 7/1990 |
| EP | 0431924 A2 | 6/1991 |
| JP | 2002265591 A | 9/2002 |
| JP | 2003261671 A1 | 9/2003 |
| KR | 20040016514 A | 2/2004 |
| KR | 100878453 B1 | 1/2009 |
| WO | 9606881 | 3/1996 |
| WO | 0138061 A1 | 5/2001 |
| WO | 02102576 A1 | 12/2002 |
| WO | 2013175448 A1 | 11/2013 |
| WO | 2014072923 A1 | 5/2014 |

OTHER PUBLICATIONS

Cox et al.; International Application No. PCT/US2015/024452; entitled "Powder Bed Fusing Thermoplastic Polymers"; International Filing Date Apr. 6, 2015; pp. 1-27.
Hwang et al., "Crystallization of Polycarbonate in Solvent/Nonsolvent System and Its Application to High-Denisty Polyethylene Composite as a Filler", Polymer Engineering and Science, vol. 54, No. 8, XP055316639, Aug. 29, 2013, pp. 1893-1899.
International Preliminary Report on Patentability for International Application No. PCT/US2016/038631; International filing date Jun. 22, 2016; dated Jun. 2, 2017; 16 pages.

(Continued)

*Primary Examiner* — Terressa Boykin
(74) *Attorney, Agent, or Firm* — Cantor Colburn LLP

(57) ABSTRACT

A method of preparing a partially crystalline polycarbonate powder, including: dissolving an amorphous polycarbonate in a halogenated alkane solvent to form a solution; combining the solution with a crystallizing non-solvent that is miscible with the halogenated alkane solvent, under high shear mixing conditions effective to form a partially crystalline polycarbonate precipitate having a D90 particle size of less than 150 micrometers; an average particle diameter of less than or equal to 100 micrometers, or an average particle diameter of 0 to 100 micrometers; and at least 20% crystallinity, or at least 25% crystallinity, or 25 to 35% crystallinity.

19 Claims, No Drawings

(56) References Cited

OTHER PUBLICATIONS

International Search Report for International Application No. PCT/IB2016/055077, International Filing Date Aug. 25, 2016, dated Nov. 28, 2016, 6 pages.
International Search Report International Application No. PCT/US2016/038631, International Filing Date Jun. 22, 2016, dated Oct. 6, 2016, 6 pages.
Matteazzi; "Final Report Summary—StepUp (Step Up in Polymer Based RM Processes)"; European Union, Project Reference No. 213927; 2014; pp. 1-14.
Sohn; "Crystallization Behavior of Bisphenol-A Polycarbonate: Effects of Crystallization Time, Temperature, and Molar Mass"; Virginia Polytechnic Institute and State University; Apr. 2000; pp. 1-263.
Written Opinion for International Application No. PCT/IB2016/055077, International Filing Date Aug. 25, 2016, dated Nov. 28, 2016, 8 pages.
Written Opinion for International Application No. PCT/US2016/038631, International Filing Date Jun. 22, 2016, dated Oct. 6, 2016, 6 pages.
Chen et al., "Gas phage induced crystalization and morphology of bisphenol A polycarbonate", Fudan University; pp. 6-9.

METHOD OF PRODUCING CRYSTALLINE POLYCARBONATE POWDERS

CROSS-REFERENCE TO RELATED APPLICATIONS

This application is a National Stage application of PCT/IB2016/055077, filed Aug. 25, 2016, which claims the benefit of U.S. Provisional Application No. 62/210,032, filed Aug. 26, 2015, both of which are incorporated by reference herein in their entirety.

BACKGROUND

This application relates to methods for producing crystalline polycarbonate powders, and in particular to crystalline polycarbonate powders useful in additive manufacturing.

Additive manufacturing (AM), also known in the art as "three-dimensional" or "3D" printing, is a process for the manufacture of three-dimensional objects by formation of multiple fused layers.

AM methods that can be conducted using thermoplastic polymers such as polycarbonate include material extrusion (ME), for example fused deposition modelling, and powder bed fusing. In powder bed fusing thermal energy selectively fuses regions of a powder bed. In particular, selective laser sintering (SLS) is a powder bed fusion process using one or more lasers to fuse powdered thermoplastic polymers into the desired three-dimensional shape. Preferred powders for these processes have of a uniform shape, and size and composition. The preparation of such powders from thermoplastic polymers on an economic, large scale is not straightforward. In addition, It can be difficult to use amorphous polycarbonates, particularly in powder bed fusing processes such as SLS because they do not have a sharp melting point. This property causes the applied thermal energy source (e.g., a laser beam) to be dissipated into the regions surrounding where the energy beam strikes the bed. This undesired dissipation of thermal energy can cause unstable processing as well as poor feature resolution in the intended three-dimensional articles being produced. Preparation of crystalline polycarbonate having the desired particle sizes, particularly for powder bed fusion, is particularly difficult. Thus a need remains in the art for polycarbonate powder having good crystallinity and good particle size distribution.

SUMMARY

A method of preparing a partially crystalline polycarbonate powder comprises: dissolving an amorphous polycarbonate in a halogenated alkane solvent to form a solution; combining the solution with a crystallizing non-solvent that is miscible with the halogenated alkane solvent, under high shear mixing conditions effective to form a partially crystalline polycarbonate precipitate having a D90 particle size of less than 150 micrometers; an average particle diameter of less than or equal to 100 micrometers, or an average particle diameter of 10 to 100 micrometers; and at least 20% crystallinity, or at least 25% crystallinity, or 25 to 35% crystallinity.

A partially crystalline polycarbonate powder prepared by the above method is also described.

In another embodiment, a powder composition comprises: a partially crystalline polycarbonate powder having a D90 particle size of less than 150 micrometers; an average particle diameter of less than or equal to 100 micrometers, or an average particle diameter of 10 to 100 micrometers; and at least 20% crystallinity, or at least 25% crystallinity, or 25 to 35% crystallinity.

A method of preparing a three-dimensional article comprises: providing a powder composition comprising a partially crystalline polycarbonate powder made by the method of any of claims 1 to 5; and powder bed fusing the powder composition to form a three-dimensional article.

A three-dimensional article made using the powder composition comprises a plurality of fused layers.

The above described and other features are exemplified by the following detailed description, examples, and claims.

DETAILED DESCRIPTION

Disclosed herein are methods of converting an amorphous polycarbonate to a partially crystalline polycarbonate powder. The method includes dissolving the amorphous polycarbonate in a solvent and subsequently combining and a crystallizing non-solvent while applying high speed mixing. The method can have one or more of the following advantages. For example, a partially crystalline polycarbonate powder can be precipitated having good crystallinity, particle size distribution, and flowability. A majority of the particles of the partially crystalline polycarbonate powder can have a size of less than 150 micrometers (μm). The partially crystalline polycarbonate powder can therefore be effectively used in powder bed fusion processes, e.g., selective laser sintering processes, to produce layers having a thickness of 100 μm to 150 μm.

Disclosed herein also are methods for powder bed fusing a powder composition including the partially crystalline polymer powder, to form a three-dimensional article. Due to the good flowability of the partially crystalline polycarbonate powder, a smooth and dense powder bed can be formed allowing for optimum precision and density of the sintered part. Also, the partially crystalline nature of the polymeric material allows for ease of processing. Moreover, the use of these crystalline polymeric materials also results in lower required melting energy versus the melting of corresponding amorphous polymeric materials.

The terms "amorphous" and "crystalline" as used herein mean their usual meanings in the polymer art. For example, in an amorphous polymer (e.g. polycarbonate) the molecules can be oriented randomly and can be intertwined, much like cooked spaghetti, and the polymer can have a glasslike, transparent appearance. In crystalline polymers, the polymer molecules can be aligned together in ordered regions, much like uncooked spaghetti. In the polymer art, some types of crystalline polymers are sometimes referred to as semi-crystalline polymers. The term "crystalline" as used herein refers to both crystalline and semi-crystalline polymers.

The term "partially crystalline polycarbonate" as used herein means a portion of the polycarbonate polymer is in crystalline form.

The term "percent crystallinity" or "% crystallinity" as used herein, refers to the portion of the amorphous polymer that has been converted to the partially crystalline form. The percentage is based upon the total weight of the partially crystalline polymer.

The particle size of the partially crystalline polycarbonate can affect the ability to use the polymer in powder bed fusion processes. In some embodiments, the partially crystalline polycarbonate powder has a D50 of less than 150 μm. As used herein, D50 refers to the particle diameter of the powder where 50 wt % of the particles in the total distribution of the referenced sample have the noted particle diameter or smaller. Similarly, a D90 refers to the particle diameter of the powder where 90 wt % of the particles in the total distribution of the referenced sample have the noted particle diameter or smaller; and D95 refers to the particle diameter of the powder where 95 wt % of the particles in the total distribution of the referenced sample have the noted particle diameter or smaller. Particle sizes can be measured by any suitable methods known in the art to measure particle size by diameter. In some embodiments, the particle size is determined by laser diffraction as is known in the art. For example, particle size can be determined using a diffractometer such as the Mastersizer 3000 from Malvern.

The term "average particle diameter" refers to the average (mean) size of the particles as measured by diameter. The term "high shear mixing conditions" refers to methods of agitating the components in a mixture (e.g. liquid mixture) under conditions in which high shear forces are generated. As is known in the art, a high shear mixer creates patterns of flow and turbulence, generally using an impellor that rotates inside a stator. Once the impellor has drawn mixture in, it subjects the mixture sudden changes of direction and acceleration, often approaching 90 degrees, such that the mixture contacts the wall of the stator with centrifugal force, or is forced through the holes in the stator at great pressure and speed, in a final disintegrating change of direction and acceleration. In exemplary embodiments of high shear mixing conditions, the high shear mixing comprises mixing at speeds of 2,000 rotations per minute (rpm) to 20,000 rpm, specifically, 3,000 rpm to 15,000 rpm, more specifically 4,000 rpm to 10,000 rpm. High shear mixing can be achieved with any commercially available high shear mixers. For example, a high shear mixer such as a Silverson L5M homogenizer can be used.

The term "powder bed fusing" or "powder bed fusion" is used herein to mean processes wherein the polycarbonate is selectively sintered or melted and fused, layer-by-layer to provide a 3-D object. Sintering can result in objects having a density of less than about 90% of the density of the solid powder composition, whereas melting can provide objects having a density of 90%-100% of the solid powder composition. Use of crystalline polycarbonate as herein disclosed can facilitate melting such that densities close to achieved by injection molded can be attained.

Powder bed fusing or powder bed fusion further includes all laser sintering and all selective laser sintering processes as well as other powder bed fusing technologies as defined by ASTM F2792-12a. For example, sintering of the powder composition can be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation can be used, including, for example, infrared radiation sources, microwave generators, lasers, radiative heaters, lamps, or a combination thereof. In some embodiments, selective mask sintering ("SMS") techniques can be used to produce three-dimensional articles of the invention. For further discussion of SMS processes, see for example U.S. Pat. No. 6,531,086 which describes an SMS machine in which a shielding mask is used to selectively block infrared radiation, resulting in the selective irradiation of a portion of a powder layer. If using an SMS process to produce articles from powder compositions of the invention, it can be desirable to include one or more materials in the powder composition that enhance the infrared absorption properties of the powder composition. For example, the powder composition can include one or more heat absorbers or dark-colored materials (e.g., carbon black, carbon nanotubes, or carbon fibers).

Also included herein are all three-dimensional products made by powder bed fusing these powder compositions. After a layer-by-layer manufacture of an article of manufacture, the article can exhibit excellent resolution, durability, and strength. These articles of manufacture can have a wide variety of uses, including as prototypes and as end products as well as molds for end products.

In particular, powder bed fused (e.g., laser sintered) articles can be produced from the powder compositions using any suitable powder bed fusing processes including laser sintering processes. These articles can include a plurality of overlying and adherent sintered layers that include a polymeric matrix which, in some embodiments, have reinforcement particles dispersed throughout the polymeric matrix. Laser sintering processes are sufficiently well known, and are based on the selective sintering of polymer particles, where layers of polymer particles are briefly exposed to laser light and the polymer particles exposed to the laser light are thus bonded to one another. Successive sintering of layers of polymer particles produces three-dimensional objects. Details concerning the selective laser sintering process are found, by way of example, in the specifications U.S. Pat. No. 6,136,948 and WO 96/06881. However, the powder described herein can also be used in other rapid prototyping or rapid manufacturing processing of the prior art, in particular in those described above. For example, the powder can in particular be used for producing moldings from powders via the SLS (selective laser sintering) process, as described in U.S. Pat. No. 6,136,948 or WO 96/06881, via the SIB process (selective inhibition of bonding of powder), as described in WO 01/38061, via 3D printing, as described in EP 0 431 924, or via a microwave process, as described in DE 103 11 438. The specifications cited, and in particular the processes described therein, are expressly incorporated into the disclosure content of the present description of the invention by way of reference.

In some embodiments of the methods, a plurality of layers is formed in a preset pattern by an additive manufacturing process. "Plurality" as used in the context of additive manufacturing includes 5 or more layers, or 20 or more layers. The maximum number of layers can vary greatly, determined, for example, by considerations such as the size of the article being manufactured, the technique used, the capabilities of the equipment used, and the level of detail desired in the final article. For example, 5 to 100,000 layers can be formed, or 20 to 50,000 layers can be formed, or 50 to 50,000 layers can be formed.

As used herein, "layer" is a term of convenience that includes any shape, regular or irregular, having at least a predetermined thickness. In some embodiments, the size and configuration two dimensions are predetermined, and on some embodiments, the size and shape of all three-dimensions of the layer is predetermined. The thickness of each layer can vary widely depending on the additive manufacturing method. In some embodiments the thickness of each layer as formed differs from a previous or subsequent layer. In some embodiments, the thickness of each layer is the same. In some embodiments the thickness of each layer as formed is 0.5 millimeters (mm) to 5 mm.

The preset pattern can be determined from a three-dimensional digital representation of the desired article as is known in the art and described in further detail below.

The fused layers of powder bed fused articles can be of any thickness suitable for selective laser sintered processing. The individual layers can be each, on average, preferably at least 50 micrometers (μm) thick, more preferably at least 80 μm thick, and even more preferably at least 100 μm thick. In a preferred embodiment, the plurality of sintered layers are each, on average, preferably less than 500 μm thick, more preferably less than 300 μm thick, and even more preferably less than 200 μm thick. Thus, the individual layers for some embodiments can be 50 to 500 μm, 80 to 300 μm, or 100 to 200 μm thick. Three-dimensional articles produced from powder compositions of the invention using a layer-by-layer powder bed fusing processes other than selective laser sintering can have layer thicknesses that are the same or different from those described above.

"Polycarbonate" as used herein means a polymer or copolymer having repeating structural carbonate units of formula (1)

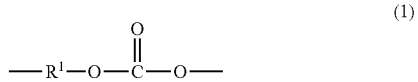

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

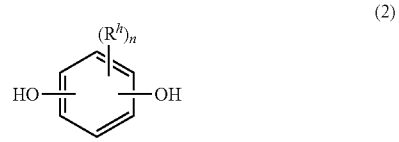

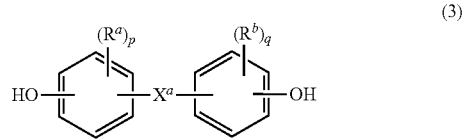

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group. Some illustrative examples of dihydroxy compounds that can be used are described, for example, in WO 2013/175448 A1, US 2014/0295363 and WO 2014/072923.

Specific dihydroxy compounds include resorcinol, 2,2-bis (4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

"Polycarbonate" as used herein also includes copolymers comprising carbonate units and ester units ("poly(ester-carbonate)s", also known as polyester-polycarbonates). Poly (ester-carbonate)s further contain, in addition to recurring carbonate chain units of formula (1), repeating ester units of formula (4)

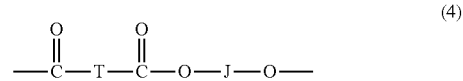

wherein J is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Copolyesters containing a combination of different T or J groups can be used. The polyester units can be branched or linear.

Specific dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), specifically linear $C_{8-12}$ aliphatic dicarboxylic acid such as decanedioic acid (sebacic acid); and alpha, omega-$C_u$ dicarboxylic acids such as dodecanedioic acid (DDDA). Aromatic dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1, specifically, 10:90 to 90:10, more specifically, 25:75 to 75:25, or from 2:98 to 15:85.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 5,000 to 200,000 Daltons, specifically 15,000 to 100,000 Daltons, as measured by gel permeation chromatography (GPC), using a crosslinked styrene-divinylbenzene column and calibrated to polycarbonate references. GPC samples are prepared at a concentration of 1 mg per ml (mg/ml), and are eluted at a flow rate of 1.5 ml per minute.

In exemplary embodiments, the method of preparing a partially crystalline polycarbonate powder comprises dissolving an amorphous polycarbonate in a halogenated alkane solvent. The amorphous polycarbonate is soluble in the halogenated alkane solvent and thus a polycarbonate solution is formed. In general, the solution can be prepared at room temperature. The solution is combined with, for example is slowly added over a period of time (e.g., 10 minutes) to a crystallizing non-solvent while agitating under high shear mixing conditions. The mixing can be carried out in-line or batch. The process can readily be carried out at manufacturing scale.

Without being bound by theory, it is believed that combining the solution of amorphous polycarbonate with the crystallizing non-solvent under high shear mixing causes the crystallization of the polymer chains and results in the precipitation of a partially crystalline polymer powder. It is further believed that when the precipitation occurs under high shear mixing conditions, the formation of an increased percentage of crystalline polycarbonate particles occurs while simultaneously preventing firmly agglomerated polycarbonate particles. It has been found, for example, that even if agglomerates are formed after the removal of solvents, the agglomerates are readily broken by crushing, high speed mixing, or other low- or medium-force shearing processes.

Following precipitation, the halogenated alkane and crystallizing non-solvent are removed and the partially crystalline polymer powder is dried by heat with or without vacuum. The resulting crystalline polycarbonate powder can have a higher percentage of particles having a particle size of less than 150 micrometers, as well as a relatively narrow particle size distribution.

Suitable halogenated alkanes include, for example, $C_{1-6}$ alkanes comprising at least one halogen (preferably chlorine, fluorine, or a combination comprising at least one of the foregoing), preferably at least two halogens (preferably chlorine, fluorine, or a combination comprising at least one of the foregoing). Preferred solvents include dichloromethane, chloroform, or a combination comprising at least one of the foregoing solvents.

The non-solvent is selected to be miscible with the halogenated alkane, and to provide a partially crystalline product under high shear conditions. The crystallizing non-solvent can be a ketone such as acetone, methyl ethyl ketone, or the like.

In exemplary embodiments, the crystalline polycarbonate powder has a D85 particle size of less than 150 micrometers, specifically, a D90 particle size of less than 150 micrometers. In some embodiments, the crystalline polycarbonate powder has a D93 particle size of less than 150 micrometers, in which 93% of the crystalline polycarbonate powder has a particle size of less than 150 μm. A partially crystalline polycarbonate powder in which 100% of the particles have a size of less than 150 micrometers can also be produced by this method.

The partially crystalline polycarbonate powder also has an average particle diameter of less than or equal to 100 μm. Specifically, the partially crystalline polycarbonate powder has an average particle diameter of 10 μm to 100 μm.

In some embodiments, the crystalline polycarbonate powder has a percent crystallinity of at least 20%, for example 20% to 80%, specifically, at least 25%, for example 25% to 60%, more specifically at least 27%, for example 27% to 40%. The partially crystalline polycarbonate powder can also have 25% to 30% crystallinity.

In exemplary embodiments, a method of preparing an article comprises providing a powder composition comprising the partially crystalline polycarbonate powder, and powder bed fusing the powder composition to form a three-dimensional article. The at least one partially crystalline polycarbonate powder can have a D50 particle size of less than 150 micrometers in diameter and is made by above-described methods. Specifically, the partially crystalline polycarbonate powder is made by converting an amorphous polycarbonate to the crystalline polycarbonate powder. The conversion of the amorphous polycarbonate comprises dissolving the amorphous polycarbonate in a halogenated alkane solvent to form a solution, combining the solution with a non-solvent under high shear mixing conditions to form a precipitate, removing the solvent and non-solvent from the precipitate, drying the precipitate, and recovering the crystalline polycarbonate powder.

The crystalline polycarbonate powder can be used as the sole component in the powder composition and applied directly in a powder bed fusing step. Alternatively, the crystalline polycarbonate powder can first be mixed with other polymer powders, for example, another crystalline polymer or an amorphous polymer, or a combination of a partially crystalline polymer and an amorphous polymer. The crystalline polycarbonate powder can also be combined with other additives/components such as those listed below.

The powder composition used in the powder bed fusing comprises between 50 wt % to 100 wt % of the crystalline polycarbonate, based on the total weight of all polymeric materials in the powder composition.

Besides the crystalline polycarbonate, the powder composition can contain other optional components. An optional component is present in a sufficient amount to perform its intended function without adversely affecting the powder composition or an article prepared therefrom. Optional components can have an average particle diameter which falls within the range of the average particle diameters of the crystalline polycarbonate powder or the optional flow agent. If necessary, each optional component is milled to the desired particle size and/or particle size distribution.

The optional components can be particulate materials and include organic and inorganic materials such as fillers, flow agents, and coloring agents. Still other additional optional components can also include, for example, toners, extenders, fillers, colorants (e.g., pigments and dyes), lubricants, anti-corrosion agents, thixotropic agents, dispersing agents, anti-oxidants, adhesion promoters, light stabilizers, organic solvents, surfactants, flame retardants, anti-static agents, plasticizers a combination comprising at least one of the foregoing. Yet another optional component also can be a second polymer that modifies the properties of the partially crystalline polycarbonate.

Each individual optional component, if present at all, typically is present in the powder composition in an amount of 0.01 wt % to 30 wt %, based on the total weight of the powder composition. The total amount of all optional components in the powder composition ranges from 0 up to 30 wt % based on the total weight of the powder composition.

It is not necessary for each optional component to melt during the laser sintering process. However, each optional component must be compatible with the partially crystalline polycarbonate polymer in order to provide a strong and durable article of manufacture. The optional component, therefore, can be a reinforcing agent that imparts additional strength to the article of manufacture. Examples of the reinforcing agent include glass fibers, carbon fibers, talc, clay, wollastonite, glass beads, or a combination comprising at least one of the foregoing reinforcing agents.

The powder composition can optionally contain a flow agent. In particular, the powder composition contains a particulate flow agent in an amount of 0.01 wt % to 5 wt %, specifically, 0.05 wt % to 1 wt %, based on the total weight of the powder composition. In some embodiments, the powder composition comprises the particulate flow agent in an amount of 0.1 wt % to 0.25 wt %, based on the total weight of the powder composition.

This optional flow agent included in the powder composition is a particulate inorganic material having a median particle size of 10 μm or less, and is chosen from the group consisting of a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate. The flow agent preferably is present in an amount sufficient to allow the polyetherimide to flow and level on the build surface of the laser sintering device. One useful flow agent is fumed silica.

Another optional component is a coloring agent, for example a pigment or a dye, like carbon black, to impart a desired color to the article of manufacture. The coloring agent is not limited, as long as the coloring agent does not adversely affect the composition or an article prepared therefrom, and is sufficiently stable to retain its color under conditions of the laser sintering process and during exposure to the laser.

Still other additional optional additives can also include, for example, toners, extenders, fillers, colorants (e.g., pigments and dyes), lubricants, anticorrosion agents, thixotropic agents, dispersing agents, antioxidants, adhesion promoters, light stabilizers, organic solvents, surfactants, flame retardants, anti-static agents, plasticizers a combination comprising at least one of the foregoing.

Still another optional component also can be a second polymer that modifies the properties of the partially crystalline polycarbonate.

The powder composition is a fusible powder composition and can be used in a powder bed fusing process such as selective laser sintering. An example of a SLS system for fabricating a part from a fusible powder composition, and in particular for fabricating the part from the fusible crystalline polycarbonate powder disclosed herein, can be described as follows. One thin layer of powder composition comprising the partially crystalline polycarbonate powder is spread over the sintering chamber. The laser beam traces the computer-controlled pattern, corresponding to the cross-section slice of the CAD model, to melt the powder selectively which has been preheated to slightly below its melting temperature. After one layer of powder is sintered, the powder bed piston is lowered with a predetermined increment (typically 100 μm), and another layer of powder is spread over the previous sintered layer by a roller. The process then repeats as the laser melts and fuses each successive layer to the previous layer until the entire part is completed.

Three-dimensional articles comprising a plurality of fused layers can thus be made using the partially crystalline polycarbonate powder described herein.

The following Examples further illustrate the above concepts.

EXAMPLES

Comparative Example

Ground polycarbonate having an average particle diameter of 234 μm in diameter was immersed in acetone for 30 minutes. After this, the acetone was removed and the resulting ground PC powder, which becomes agglomerated, was dried overnight. The crystallized PC was ground yet another time in order to break up the agglomerates and the final powder (number average particle diameter of 247 μm) was sieved. The crystallinity of the polycarbonate powder was 20%. Prior to sieving, only 25% of the polycarbonate particles had a size of 150 μm or less.

Example

In a glass beaker, 20 wt % polycarbonate was dissolved in dichloromethane (DCM) at room temperature. An amount of 200 grams (g) of the dissolved polycarbonate was transferred into a glass separatory funnel with tap and the polycarbonate solution was gradually added (~10 minutes) to a glass beaker filled with 400 ml of acetone with constant stirring at 6000 rpm using a Silverson L5M homogenizer. Once all of the polycarbonate solution was combined with the acetone, the final mixture was stirred for an additional minute and then the powder was left for a period of 30 minutes to settle down. The acetone and dichloromethane were decanted and the wet powder was dried in an oven a 100° C. for 2 hours.

The powder obtained by the above-described process was made up of ~93% particles having an average size of less than 150 μm in diameter (i.e. D93 of less than 150 μm). The crystallinity of the polycarbonate powder was 27.4%.

An example of a selective laser sintering system for fabricating a part from a fusible powder, and in particular for fabricating the part from the fusible crystalline polycarbonate powder produced in the Example, is as follows. One thin layer (e.g., 10 to 200 μm) of crystalline polycarbonate powder is spread over the sintering chamber. The laser beam traces the computer-controlled pattern, corresponding to the cross-section slice of the CAD model, to melt the powder selectively which has been preheated to slightly below its melting temperature. After one layer of powder is sintered, the powder bed piston is lowered with a predetermined increment (typically 100 μm), and another layer of powder is spread over the previous sintered layer by a roller. The process then repeats as the laser melts and fuses each successive layer to the previous layer until the entire part is completed.

Precipitation and Crystal Formation Evaluation

The precipitation and crystal formation properties of ten (10) different types of polycarbonate polymer products commercially available from the Innovative Plastics division of SABIC were evaluated. These 10 products are identified in Table 1 below. This evaluation does not involve high shear mixing that is needed to obtain a specific particle size.

In each of these 10 tests, 5 grams of polymer product was dissolved in 10 milliliters of dichloromethane (DCM) solvent in a glass vial and then 10 milliliters of acetone nonsolvent was added to that polymer/DCM mixture. Each of these 10 sample mixtures were then allowed to sit for a day and the existence or not of a precipitate was observed. The results of these observations are shown in Table 1 below.

To measure Crystallinity Percent, each sample was then poured into an alumina cup and left overnight for the solvent and nonsolvent to evaporate. The evaporated samples were then tested by Differential Scanning calorimetry (DSC). The results of these DSC analysis are shown in Table 1.

As can be seen in Table 1, not all of these polymer products precipitated completely. Those that did precipitate completely ware labelled 1 to 5 in Table 1, while those that did not precipitate completely are labelled A to E. Complete precipitation would be needed for use in a commercial powder bed fusing type additive manufacturing process. Those samples 1 to 5 also had higher crystallinity percents than samples A to E as shown in Table 1. Higher crystallinity percents (i.e. above 20 percent) would be more likely to be useful in commercial powder bed fusing type additive manufacturing processes.

It is noted that that samples 1 to 5 are non-halide polycarbonate homopolymers or poly(carbonate-siloxane) polymers.

It is believed that the other five samples (A to E) may be successfully precipitated and achieve higher crystallinity percents with other solvent/non-solvent combinations or with the use of other processing techniques.

The present invention is further illustrated by the following Embodiments.

Embodiment 1

A method of preparing a partially crystalline polycarbonate powder, the method comprising: dissolving an amorphous polycarbonate in a halogenated alkane solvent to form a solution; combining the solution with a crystallizing non-solvent that is miscible with the halogenated alkane solvent, under high shear mixing conditions effective to form a partially crystalline polycarbonate precipitate having a D90 particle size of less than 150 micrometers; an average particle diameter of less than or equal to 100 micrometers, or an average particle diameter of 10 to 100 micrometers; and at least 20% crystallinity, or at least 25% crystallinity, or 25 to 35% crystallinity.

Embodiment 2

The method of Embodiment 1, further comprising: removing the halogenated alkane solvent and the crystallizing non-solvent from the precipitate; and optionally, drying the precipitate.

Embodiment 3

The method of any of Embodiments 1-2, wherein the halogenated alkane solvent comprises dichloromethane, chloroform or a combination comprising at least one of the foregoing.

TABLE 1

| Example | Trade Name | Chemical Name | Precipitate (yes/no) | Melt Temperature (C.) | Crystallinity |
|---|---|---|---|---|---|
| 1 | High flow PC Mw = 17800 | Polycarbonate homopolymer | Yes | 229.0 | 31.4 |
| 2 | Low flow PC Mw = 30500 | Polycarbonate homopolymer | Yes | 229.5 | 26.3 |
| A | Brominated PC | Brominated polycarbonate resin | No | 292.4 | 6.2 |
| 3 | EXL resin 6% siloxane | Poly(carbonate-siloxane) comprising bisphenol A carbonate units and siloxane units | Yes | 232.4 | 25.6 |
| 4 | EXL resin 20% siloxane | Poly(carbonate-siloxane) comprising bisphenol A carbonate units and siloxane units | Yes | 232.4 | 20.5 |
| B | Lexan XHT resin | Polycarbonate copolymers derived from BPA and PPPBP | No | 236.7 | 6.0 |
| C | SLX resin 20% ITR | Polycarbonate copolymers with isophthalate-terephthalate-bisphenol A ester units | No | 190.8 | 11.9 |
| 5 | FST resin | Poly(ester-carbonate-siloxane)s comprising bisphenol A carbonate units, isophthalate-terephthalate-bisphenol A ester units, and siloxane units | Yes | 204 | 26.6 |
| D | LEXAN HFD resin | Poly(aliphatic ester-carbonate comprising bisphenol A carbonate units and sebacic acid-bisphenol A ester units | No | 210 | 11.7 |
| E | DMX resin 50% DMBPC | Polycarbonate copolymers derived from BPA and DMBPC | No | 237 | 6.2 |

Embodiment 4

The method of any of Embodiments 1-3, wherein the crystallizing non-solvent is acetone, methyl ethyl ketone, or a combination comprising at least one of the foregoing.

Embodiment 5

The method of any of Embodiments 1-4, wherein the high shear mixing comprises mixing at a speed of 2,000 to 20,000 rpm.

Embodiment 6

A partially crystalline polycarbonate powder prepared by the method of any of Embodiments 1-5.

Embodiment 7

A powder composition comprising a partially crystalline polycarbonate powder having a D90 particle size of less than 150 micrometers; an average particle diameter of less than or equal to 100 micrometers, or an average particle diameter of 10 to 100 micrometers; and at least 20% crystallinity, or at least 25% crystallinity, or 25 to 35% crystallinity.

Embodiment 8

A method of preparing a three-dimensional article, the method comprising: providing a powder composition comprising a partially crystalline polycarbonate powder made by the method of any of Embodiments 1 to 5; and powder bed fusing the powder composition to form a three-dimensional article.

Embodiment 9

A method of preparing a three-dimensional article, the method comprising: providing a powder composition comprising a partially crystalline polycarbonate powder having a D90 particle size of less than 150 micrometers; an average particle diameter of less than or equal to 100 micrometers, or an average particle diameter of 10 to 100 micrometers; and at least 20% crystallinity, or at least 25% crystallinity, or 25 to 35% crystallinity; and powder bed fusing the powder composition to form a three-dimensional article.

Embodiment 10

The method of any of Embodiments 8-9, further comprising adding at least one additive to the powder composition before powder bed fusing, wherein the additive is a flow agent, toner, extender, filler, colorant, lubricant, anti-corrosion agent, thixotropic agent, dispersing agent, antioxidant, adhesion promoter, light stabilizer, organic solvent, surfactant, flame retardant, anti-static agent, plasticizer, or a combination comprising at least one of the foregoing.

Embodiment 11

The method of Embodiment 10, comprising adding 0.05% to 5% of a flow agent to the powder composition.

Embodiment 12

The method of Embodiment 11, wherein the flow agent comprises a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate or a combination comprising at least one of the foregoing.

Embodiment 13

The method of any of Embodiments 10-12, comprising adding a reinforcing agent to the powder composition, preferably wherein the reinforcing agent comprises glass fibers, carbon fibers, glass beads, talcum, clay, wollastonite, or a combination comprising at least one of the foregoing.

Embodiment 14

The method of any of Embodiments 8-12, wherein the powder bed fusing comprises selective laser sintering.

Embodiment 15

A three-dimensional article made by the method of any of Embodiments 8-14, comprising a plurality of fused layers.

Embodiment 16

The three-dimensional article of Embodiment 15, comprising at least five fused layers.

Embodiment 17

The method of any of claims 1-5, wherein the amorphous polycarbonate is a non-halide polycarbonate homopolymer or a poly(carbonate-siloxane) polymer, or a combination comprising at least one of the foregoing.

Embodiment 18

A powder composition of claim 7, wherein the partially crystalline polycarbonate powder is a non-halide polycarbonate homopolymer or a poly(carbonate-siloxane) polymer, or a combination comprising at least one of the foregoing.

Embodiment 19

A method of preparing a three-dimensional article of any of claims 9-15, wherein the partially crystalline polycarbonate powder is a non-halide polycarbonate homopolymer or a poly(carbonate-siloxane) polymer, or a combination comprising at least one of the foregoing.

In general, the compositions, methods, and articles, and claims can alternatively comprise, consist of, or consist essentially of, any appropriate components herein disclosed. The invention can additionally, or alternatively, be formulated so as to be devoid, or substantially free, of any components, materials, components, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %," is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly indicated otherwise by context. Reference throughout the specification to "some embodiments", "another embodiment", "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

All references cited herein are incorporated by reference in their entirety.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

The invention claimed is:

1. A method of preparing a partially crystalline polycarbonate powder, the method comprising:
   dissolving an amorphous polycarbonate in a halogenated alkane solvent to form a solution;
   combining the solution with a crystallizing non-solvent that is miscible with the halogenated alkane solvent, under high shear mixing conditions effective to form a partially crystalline polycarbonate precipitate having
      a D90 particle size of less than 150 micrometers;
      an average particle diameter of less than or equal to 100 micrometers; and
      at least 20% crystallinity;
   wherein the crystallizing non-solvent is acetone, methyl ethyl ketone, or a combination comprising at least one of the foregoing.

2. The method of claim 1, further comprising:
   removing the halogenated alkane solvent and the crystallizing non-solvent from the precipitate; and
   optionally, drying the precipitate.

3. The method of claim 1, wherein the halogenated alkane solvent comprises dichloromethane, chloroform or a combination comprising at least one of the foregoing.

4. The method of claim 1, wherein the crystallizing non-solvent is acetone.

5. The method of claim 1, wherein the high shear mixing comprises mixing at a speed of 2,000 to 20,000 rpm.

6. A partially crystalline polycarbonate powder prepared by the method of claim 1.

7. A powder composition comprising a partially crystalline polycarbonate powder having a D90 particle size of less than 150 micrometers;
an average particle diameter of 10 to 100 micrometers; and
25 to 35% crystallinity.

8. A method of preparing a three-dimensional article, the method comprising:
   providing a powder composition comprising a partially crystalline polycarbonate powder made by the method of claim 1; and
   powder bed fusing the powder composition to form a three-dimensional article.

9. A method of preparing a three-dimensional article, the method comprising:
   providing a powder composition comprising a partially crystalline polycarbonate powder having
      a D90 particle size of less than 150 micrometers;
      an average particle diameter of less than or equal to 100 micrometers; and
      at least 20% crystallinity; and
   powder bed fusing the powder composition to form a three-dimensional article.

10. The method of claim 1, comprising adding 0.05% to 5% of a flow agent to the powder composition.

11. The method of claim 10, wherein the flow agent comprises a hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate or a combination comprising at least one of the foregoing.

12. The method of claim 1, comprising adding a reinforcing agent to the powder composition.

13. The method of claim 8, wherein the powder bed fusing comprises selective laser sintering.

14. A three-dimensional article made by the method of claim 8, comprising a plurality of fused layers.

15. The three-dimensional article of claim 14, comprising at least five fused layers.

16. The method of claim 1, wherein the amorphous polycarbonate is a non-halide polycarbonate homopolymer or a poly(carbonate-siloxane) polymer, or a combination comprising at least one of the foregoing.

17. A powder composition of claim 7, wherein the partially crystalline polycarbonate powder is a non-halide polycarbonate homopolymer or a poly(carbonate-siloxane) polymer, or a combination comprising at least one of the foregoing.

18. A method of preparing a three-dimensional article of claim 9, wherein the partially crystalline polycarbonate powder is a non-halide polycarbonate homopolymer or a poly(carbonate-siloxane) polymer, or a combination comprising at least one of the foregoing.

19. The method of claim 1, wherein the partially crystalline polycarbonate precipitate has
   a D90 particle size of less than 150 micrometers;
   an average particle diameter of 10 to 100 micrometers; and
   25 to 35% crystallinity.

* * * * *